US012786508B2

(12) United States Patent
Hiremath et al.

(10) Patent No.: US 12,786,508 B2
(45) **Date of Patent: *Nov. 3, 2026**

(54) SYSTEM AND METHOD FOR OPTIMIZING VIDEO COMMUNICATIONS BASED ON DEVICE CAPABILITIES

(71) Applicant: Damaka, Inc., Allen, TX (US)

(72) Inventors: Channamallesh G. Hiremath, Allen, TX (US); Rashmi Lohita, Allen, TX (US); Rajaraman Krishnan, Chennai (IN); Sivakumar Chaturvedi, Allen, TX (US)

(73) Assignee: Damaka, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,576

(22) Filed: Jan. 16, 2025

(65) Prior Publication Data

US 2025/0159282 A1 May 15, 2025

Related U.S. Application Data

(63) Continuation of application No. 18/365,303, filed on Aug. 4, 2023, now Pat. No. 12,231,725, which is a (Continued)

(51) Int. Cl.
*H04N 21/4402* (2011.01)
*G06T 3/40* (2006.01)
(Continued)

(52) U.S. Cl.
CPC ....... *H04N 21/440227* (2013.01); *G06T 3/40* (2013.01); *G06T 9/00* (2013.01); *H04N 21/440281* (2013.01); *H04N 21/4788* (2013.01)

(58) Field of Classification Search
CPC ..... G06T 3/40; G06T 9/00; H04N 21/440227; H04N 21/440263; H04N 21/440281; H04N 21/4788
See application file for complete search history.

(56) References Cited

U.S. PATENT DOCUMENTS 5,442,637 A 8/1995 Nguyen
5,612,744 A 3/1997 Lee et al.
(Continued)

FOREIGN PATENT DOCUMENTS

EP 1603339 A1 12/2005
EP 1638275 A2 3/2006
(Continued)

OTHER PUBLICATIONS

Balamurugan Karpagavinayagam et al. (Monitoring Architecture for Lawful Interception in VoIP Networks, ICIMP 2007, Aug. 24, 2008).
(Continued)

*Primary Examiner* — Michael B. Pierorazio

(57) ABSTRACT

A system and method for optimizing video for transmission on a device includes, in one example, the method includes capturing an original video frame and scaling the original video frame down to a lower resolution video frame. The lower resolution video frame is downscaled using a first encoder to produce a first layer output and the first layer output is decoded. The decoded first layer output is upscaled to match a resolution of the original video frame. A difference is obtained between the upscaled decoded first layer output and the original video frame. The difference is independently encoded using a second encoder to create a second layer output. The first and second layer outputs may be stored or sent to another device.

20 Claims, 8 Drawing Sheets

Related U.S. Application Data continuation of application No. 17/750,562, filed on May 23, 2022, now Pat. No. 11,770,584.

(60) Provisional application No. 63/192,051, filed on May 23, 2021.

(51) Int. Cl.
*G06T 9/00* (2006.01)
*H04N 21/4788* (2011.01)

(56) References Cited

U.S. PATENT DOCUMENTS

| | | | |
|---|---|---|---|
| 5,761,309 | A | 6/1998 | Ohashi et al. |
| 5,790,637 | A | 8/1998 | Johnson et al. |
| 5,818,447 | A | 10/1998 | Wolf et al. |
| 5,889,762 | A | 3/1999 | Pajuvirta et al. |
| 6,031,818 | A | 2/2000 | Lo et al. |
| 6,041,078 | A | 3/2000 | Rao |
| 6,128,283 | A | 10/2000 | Sabaa et al. |
| 6,141,687 | A | 10/2000 | Blair |
| 6,161,082 | A | 12/2000 | Goldberg et al. |
| 6,195,694 | B1 | 2/2001 | Chen et al. |
| 6,202,084 | B1 | 3/2001 | Kumar et al. |
| 6,219,638 | B1 | 4/2001 | Padmanabhan et al. |
| 6,298,129 | B1 | 10/2001 | Culver et al. |
| 6,311,150 | B1 | 10/2001 | Ramaswamy et al. |
| 6,343,067 | B1 | 1/2002 | Drottar et al. |
| 6,360,196 | B1 | 3/2002 | Poznanski et al. |
| 6,389,016 | B1 | 5/2002 | Sabaa et al. |
| 6,438,376 | B1 | 8/2002 | Elliott et al. |
| 6,473,425 | B1 | 10/2002 | Bellaton et al. |
| 6,574,668 | B1 | 6/2003 | Gubbi et al. |
| 6,606,112 | B1 | 8/2003 | Falco |
| 6,654,420 | B1 | 11/2003 | Snook |
| 6,674,904 | B1 | 1/2004 | McQueen |
| 6,741,691 | B1 | 5/2004 | Ritter et al. |
| 6,754,181 | B1 | 6/2004 | Elliott et al. |
| 6,766,373 | B1 | 7/2004 | Beadle et al. |
| 6,826,613 | B1 | 11/2004 | Wang et al. |
| 6,836,765 | B1 | 12/2004 | Sussman |
| 6,842,460 | B1 | 1/2005 | Olkkonen et al. |
| 6,850,769 | B2 | 2/2005 | Grob et al. |
| 6,898,413 | B2 | 5/2005 | Yip et al. |
| 6,912,278 | B1 | 6/2005 | Hamilton |
| 6,940,826 | B1 | 9/2005 | Simard et al. |
| 6,963,555 | B1 | 11/2005 | Brenner et al. |
| 6,975,718 | B1 | 12/2005 | Pearce et al. |
| 6,987,756 | B1 | 1/2006 | Ravindranath et al. |
| 6,999,575 | B1 | 2/2006 | Sheinbein |
| 6,999,932 | B1 | 2/2006 | Zhou |
| 7,006,508 | B2 | 2/2006 | Bondy et al. |
| 7,010,109 | B2 | 3/2006 | Gritzer et al. |
| 7,013,155 | B1 | 3/2006 | Ruf et al. |
| 7,079,529 | B1 | 7/2006 | Khuc |
| 7,080,158 | B1 | 7/2006 | Squire |
| 7,092,385 | B2 | 8/2006 | Gallant et al. |
| 7,117,526 | B1 | 10/2006 | Short |
| 7,123,710 | B2 | 10/2006 | Ravishankar |
| 7,184,415 | B2 | 2/2007 | Chaney et al. |
| 7,185,114 | B1 | 2/2007 | Hariharasubrahmanian |
| 7,272,377 | B2 | 9/2007 | Cox et al. |
| 7,302,496 | B1 | 11/2007 | Metzger |
| 7,304,985 | B2 | 12/2007 | Sojka et al. |
| 7,345,999 | B2 | 3/2008 | Su et al. |
| 7,346,044 | B1 | 3/2008 | Chou et al. |
| 7,353,252 | B1 | 4/2008 | Yang et al. |
| 7,353,255 | B2 | 4/2008 | Acharya et al. |
| 7,412,374 | B1 | 8/2008 | Seiler et al. |
| 7,457,279 | B1 | 11/2008 | Scott et al. |
| 7,477,282 | B2 | 1/2009 | Firestone et al. |
| 7,487,248 | B2 | 2/2009 | Moran et al. |
| 7,512,652 | B1 | 3/2009 | Appelman et al. |
| 7,542,472 | B1 | 6/2009 | Gerendai et al. |
| 7,546,334 | B2 | 6/2009 | Redlich et al. |
| 7,564,843 | B2 | 7/2009 | Manjunatha et al. |
| 7,570,743 | B2 | 8/2009 | Barclay et al. |
| 7,574,523 | B2 | 8/2009 | Traversat et al. |
| 7,590,758 | B2 | 9/2009 | Takeda et al. |
| 7,613,171 | B2 | 11/2009 | Zehavi et al. |
| 7,623,476 | B2 | 11/2009 | Ravikumar et al. |
| 7,623,516 | B2 | 11/2009 | Chaturvedi et al. |
| 7,656,870 | B2 | 2/2010 | Ravikumar et al. |
| 7,664,495 | B1 | 2/2010 | Bonner et al. |
| 7,769,881 | B2 | 8/2010 | Matsubara et al. |
| 7,774,495 | B2 | 8/2010 | Pabla et al. |
| 7,778,187 | B2 | 8/2010 | Chaturvedi et al. |
| 7,782,866 | B1 | 8/2010 | Walsh et al. |
| 7,917,584 | B2 | 3/2011 | Arthursson |
| 8,009,586 | B2 | 8/2011 | Chaturvedi et al. |
| 8,065,418 | B1 | 11/2011 | Abuan et al. |
| 8,135,232 | B2 | 3/2012 | Kimura |
| 8,200,796 | B1 | 6/2012 | Margulis |
| 8,402,551 | B2 | 3/2013 | Lee |
| 8,407,314 | B2 | 3/2013 | Chaturvedi et al. |
| 8,407,576 | B1 | 3/2013 | Yin et al. |
| 8,447,117 | B2 | 5/2013 | Liao et al. |
| 8,560,642 | B2 | 10/2013 | Pantos et al. |
| 8,611,540 | B2 | 12/2013 | Chaturvedi et al. |
| 8,990,877 | B2 | 3/2015 | Hart |
| 9,143,489 | B2 | 9/2015 | Chaturvedi et al. |
| 9,356,997 | B2 | 5/2016 | Chaturvedi et al. |
| 9,742,846 | B2 | 8/2017 | Chaturvedi et al. |
| 10,091,258 | B2 | 10/2018 | Carter et al. |
| 10,097,638 | B2 | 10/2018 | Chaturvedi et al. |
| 10,147,202 | B2 | 12/2018 | Nystad et al. |
| 10,397,600 | B1 * | 8/2019 | Xu ........................ H04N 19/52 |
| 10,834,256 | B1 | 11/2020 | Nair et al. |
| 10,887,549 | B1 | 1/2021 | Wehrung et al. |
| 10,924,709 | B1 | 2/2021 | Faulkner et al. |
| 11,315,158 | B1 | 4/2022 | Lidster et al. |
| 11,770,584 | B1 * | 9/2023 | Hiremath ............... H04N 19/33 348/14.13 |
| 12,231,725 | B2 * | 2/2025 | Hiremath ....... H04N 21/440227 |
| 2002/0112181 | A1 | 8/2002 | Smith |
| 2003/0036886 | A1 | 2/2003 | Stone |
| 2003/0164853 | A1 | 9/2003 | Zhu et al. |
| 2004/0091151 | A1 | 5/2004 | Jin et al. |
| 2004/0141005 | A1 | 7/2004 | Banatwala et al. |
| 2005/0071678 | A1 | 3/2005 | Lee et al. |
| 2005/0138110 | A1 | 6/2005 | Redlich et al. |
| 2005/0147212 | A1 | 7/2005 | Benco et al. |
| 2005/0193311 | A1 | 9/2005 | Das et al. |
| 2006/0195519 | A1 | 8/2006 | Slater et al. |
| 2006/0233163 | A1 | 10/2006 | Celi et al. |
| 2007/0003044 | A1 | 1/2007 | Liang et al. |
| 2008/0005666 | A1 | 1/2008 | Sefton et al. |
| 2008/0037753 | A1 | 2/2008 | Hofmann |
| 2008/0163378 | A1 | 7/2008 | Lee |
| 2009/0178019 | A1 | 7/2009 | Bahrs et al. |
| 2009/0178144 | A1 | 7/2009 | Redlich et al. |
| 2009/0254572 | A1 | 10/2009 | Redlich et al. |
| 2009/0282251 | A1 | 11/2009 | Cook et al. |
| 2010/0005179 | A1 | 1/2010 | Dickson et al. |
| 2010/0064344 | A1 | 3/2010 | Wang |
| 2010/0158402 | A1 | 6/2010 | Nagase et al. |
| 2010/0202511 | A1 | 8/2010 | Shin et al. |
| 2010/0250497 | A1 | 9/2010 | Redlich et al. |
| 2010/0299529 | A1 | 11/2010 | Fielder |
| 2011/0044211 | A1 | 2/2011 | Long et al. |
| 2011/0110603 | A1 | 5/2011 | Ikai |
| 2011/0129156 | A1 | 6/2011 | Liao et al. |
| 2011/0145687 | A1 | 6/2011 | Grigsby et al. |
| 2011/0164824 | A1 | 7/2011 | Kimura |
| 2012/0030733 | A1 | 2/2012 | Andrews et al. |
| 2012/0064976 | A1 | 3/2012 | Gault et al. |
| 2012/0173971 | A1 | 7/2012 | Sefton et al. |
| 2012/0252407 | A1 | 10/2012 | Poltorak |
| 2012/0321083 | A1 | 12/2012 | Phadke et al. |
| 2013/0051476 | A1 | 2/2013 | Morris |
| 2013/0063241 | A1 | 3/2013 | Simon |
| 2013/0091290 | A1 | 4/2013 | Hirokawa et al. |
| 2014/0096036 | A1 | 4/2014 | Mohler |
| 2014/0185801 | A1 | 7/2014 | Wang et al. |

(56) References Cited

U.S. PATENT DOCUMENTS

| | | | |
|---|---|---|---|
| 2014/0196094 | A1 | 7/2014 | Singh et al. |
| 2015/0295777 | A1 | 10/2015 | Cholkar et al. |
| 2016/0057391 | A1 | 2/2016 | Block et al. |
| 2016/0234264 | A1 | 8/2016 | Coffman et al. |
| 2017/0249394 | A1 | 8/2017 | Loeb et al. |
| 2018/0176508 | A1 | 6/2018 | Pell |
| 2019/0273767 | A1 | 9/2019 | Nelson et al. |
| 2020/0274965 | A1 | 8/2020 | Ravichandran |
| 2020/0301647 | A1 | 9/2020 | Yoshida |
| 2020/0382618 | A1 | 12/2020 | Faulkner et al. |
| 2021/0099574 | A1 | 4/2021 | Nair et al. |
| 2022/0086197 | A1 | 3/2022 | Lohita et al. |

FOREIGN PATENT DOCUMENTS

| | | | |
|---|---|---|---|
| EP | 1848163 | A1 | 10/2007 |
| EP | 1988698 | A1 | 11/2008 |
| EP | 1404082 | B1 | 10/2012 |
| EP | 1988697 | B1 | 2/2018 |
| JP | 2005094600 | A | 4/2005 |
| JP | 2005227592 | A | 8/2005 |
| JP | 2007043598 | A | 2/2007 |
| KR | 20050030548 | A | 3/2005 |
| WO | 03079635 | A1 | 9/2003 |
| WO | 2005009019 | A2 | 1/2005 |
| WO | 2004063843 | A3 | 3/2005 |
| WO | 2006064047 | A1 | 6/2006 |
| WO | 2006075677 | A1 | 7/2006 |
| WO | 2008099420 | A3 | 12/2008 |

OTHER PUBLICATIONS

Blanchet et al; "IPV6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.

Chathapuram, "Security in Peer-to-Peer Networks", Aug. 8, 2001, XP002251813.

Cooper et al.; "NAT Traversal for dSIP"; Feb. 25, 2007; IETF; IETF draft draft-matthews-p2psip-dsip-nat-traversal-00; pp. 1-23.

Cooper et al.; "The Effect of NATs on P2PSIP Overlay Architecture"; IETF; IETF draft draft-matthews-p2psip-nats-and-overlays-01.txt; pp. 1-20.

Dunigan, Tom, "Almost TCP over UDP (atou)," last modified Jan. 12, 2004; retrieved on Jan. 18, 2011 from 18 pgs.

Hao Wang, Skype VoIP service-architecture and comparison, In: INFOTECH Seminar Advanced Communication Services (ASC), 2005, pp. 4, 7, 8.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

J. Rosenberg et al., SIP: Session Initiation Protocol (Jun. 2008) retrieved at http://tools.ietf.org/html/rfc3261. Relevant pages provided.

J. Rosenberg et al. " Session Traversal Utilities for NAT (STUN)", draft-ietf-behave-rfc3489bis-06, Mar. 5, 2007.

Jeff Tyson, "How Instant Messaging Works", www.verizon.com/learningcenter, Mar. 9, 2005.

Mahy et al., The Session Initiation Protocol (SIP) "Replaces" Header, Sep. 2004, RFC 3891, pp. 1-16.

NiceLog User's Manual 385A0114-08 Rev. A2, Mar. 2004.

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

Philippe Bazot et al., Developing SIP and IP Multimedia Subsystem (IMS) Applications (Feb. 5, 2007) retrieved at redbooks IBM form No. SG24-7255-00. Relevant pages provided.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

RFC 5694 ("Peer-to-Peer (P2P) Architecture: Definition, Taxonomies, Examples, and Applicability", Nov. 2009).

Rory Bland, et al., "P2P Routing" Mar. 2002.

Rosenberg, "STUN—Simple Traversal of UDP Through NAT", Sep. 2002, XP015005058.

Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.

Salman A. Baset, et al., "An Analysis of the Skype Peer-to-Peer Internet Telephony Protocol", Department of Computer Science, Columbia University, New York, NY, USA, Sep. 15, 2004.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007—Spring. IEEE 65th, Apr. 22-25, 2007, pp. 1121-1126.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet ].

Srisuresh et al.; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.

T. Dierks & E. Rescorla, The Transport Layer Security (TLS) Protocol (Ver. 1.2, Aug. 2008) retrieved at http://tools.ietf.org/htmllrfc5246. Relevant pages provided.

Wireless Application Protocol—Wireless Transport Layer Security Specification, Version 18—Feb. 2000, Wireless Application Forum, Ltd. 2000; 99 pages.

WISPA: Wireless Internet Service Providers Association; WISPA-CS-IPNA-2.0; May 1, 2009.

* cited by examiner

SYSTEM AND METHOD FOR OPTIMIZING VIDEO COMMUNICATIONS BASED ON DEVICE CAPABILITIES

CROSS-REFERENCE TO RELATED APPLICATIONS

This application is a Continuation of U.S. application Ser. No. 18/365,303, filed Aug. 4, 2023, entitled SYSTEM AND METHOD FOR OPTIMIZING VIDEO COMMUNICATIONS BASED ON DEVICE CAPABILITIES, which is a Continuation of U.S. patent application Ser. No. 17/750,562, filed May 23, 2022, entitled SYSTEM AND METHOD FOR OPTIMIZING VIDEO COMMUNICATIONS BASED ON DEVICE CAPABILITIES, which claims the benefit of U.S. Provisional Application Ser. No. 63/192,051, filed on May 23, 2021, and entitled SYSTEM AND METHOD FOR OPTIMIZING VIDEO COMMUNICATIONS BASED ON DEVICE CAPABILITIES, which are hereby incorporated by reference in their entirety.

BACKGROUND

The manner in which communication sessions with remote parties occur is currently limited in functionality and flexibility. Accordingly, what is needed are a system and method that addresses these issues.

SUMMARY

In some example embodiments, a method for optimizing video for transmission on a device based on the device's capabilities includes capturing, by a camera associated with the device, an original video frame, scaling the original video frame down to a lower resolution video frame, encoding the lower resolution video frame using a first encoder to produce a first layer output, decoding the first layer output, upscaling the decoded first layer output to match a resolution of the original video frame, obtaining a difference between the upscaled decoded first layer output and the original video frame, and encoding the difference using a second encoder to create a second layer output, wherein the encoding to produce the second layer output occurs independently from the encoding to produce the first layer output.

In one or more of the above examples, the first and second encoders perform the encoding of the first and second layer outputs, respectively, using different video coding standards.

In one or more of the above examples, the first and second encoders perform the encoding of the first and second layer outputs, respectively, using identical video coding standards.

In one or more of the above examples, the method further includes communicating, by the device, with another device in order to determine which video coding standard is to be used to perform the encoding by each of the first and second encoders.

In one or more of the above examples, the method further includes sending the first and second layer outputs to another device during a video call.

In one or more of the above examples, the method further includes sending the first and second layer outputs to a storage device.

In some example embodiments, a method for decoding video for display by a device, the method includes receiving an encoded first video frame and an encoded second video frame, independently decoding the encoded first and second video frames using a first decoder and a second decoder, respectively, upscaling the decoded first video frame to a resolution matching a resolution of the decoded second video frame, and adding the upscaled decoded first video frame and the decoded second video frame to create an additive video frame.

In one or more of the above examples, the first and second decoders perform the decoding of the encoded first and second video frames, respectively, using different video coding standards.

In one or more of the above examples, the first and second decoders perform the decoding of the encoded first and second video frames, respectively, using identical video coding standards.

In one or more of the above examples, the method further includes sending the additive video frame for display by the device.

In one or more of the above examples, receiving the encoded first video frame and the encoded second video frame includes retrieving the encoded first video frame and the encoded second video frame from a storage device.

In some example embodiments, a device or system for sending and receiving optimized video frames includes a processor. and a memory coupled to the processor, the memory having a plurality of instructions stored therein for execution by the processor, the plurality of instructions including instructions for scaling an original video frame down to a lower resolution video frame, encoding the lower resolution video frame using a first encoder to produce a first layer output, decoding the first layer output, upscaling the decoded first layer output to match a resolution of the original video frame, obtaining a difference between the upscaled decoded first layer output and the original video frame, and encoding the difference using a second encoder to create a second layer output, wherein the encoding to produce the second layer output occurs independently from the encoding to produce the first layer output.

In one or more of the above examples, the first and second encoders perform the encoding of the first and second layer outputs, respectively, using different video coding standards.

In one or more of the above examples, the first and second encoders perform the encoding of the first and second layer outputs, respectively, using identical video coding standards.

In one or more of the above examples, the instructions further include communicating with another device in order to determine which video coding standard is to be used to perform the encoding by each of the first and second encoders.

In one or more of the above examples, the instructions further include sending the first and second layer outputs to another device during a video call.

In one or more of the above examples, the instructions further include sending the first and second layer outputs to a storage device.

BRIEF DESCRIPTION OF THE DRAWINGS

For a more complete understanding, reference is now made to the following description taken in conjunction with the accompanying Drawings in which.

DETAILED DESCRIPTION

Figures 1A, 1B, 1C:
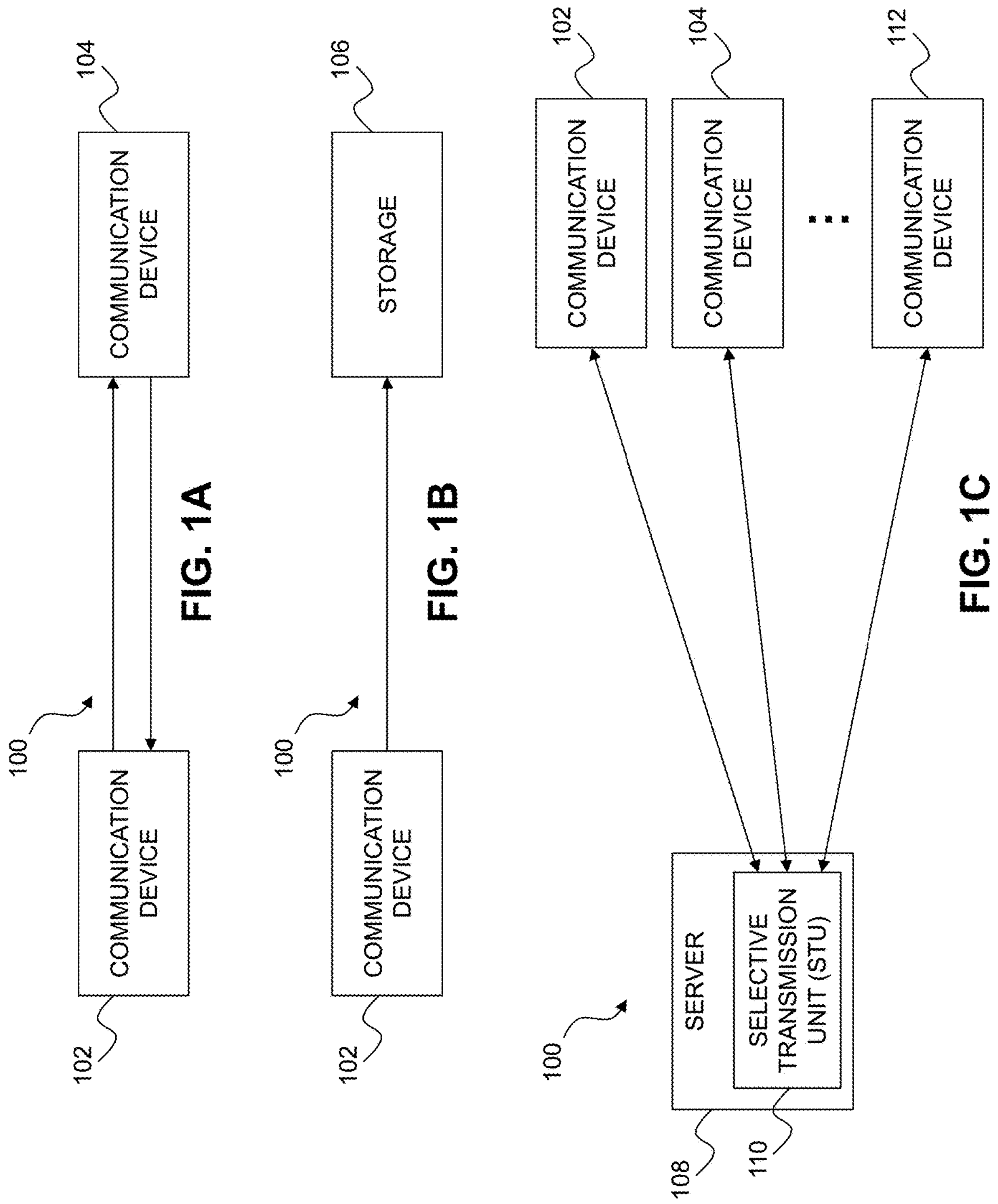
FIGS. 1A-1C illustrate various embodiments of environments within which video communications may be optimized.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIGS. 1A-1C, embodiments of an environment 100 are illustrated within which various aspects of the present disclosure may be practiced. The environment 100 of FIG. 1A includes a first communication device 102 and a second communication device 104. The two devices 102 and 104 may be involved in a one-way or two-way communication session involving video. The two devices may be similar or different, and may include identical or different hardware and/or software capabilities, such as graphics processing units (GPUs), video encoders, and video decoders.

The environment 100 of FIG. 1B illustrates video information being sent from a communication device 102 to a storage 106. The environment of FIG. 1C illustrates a conference call environment where a server 108 uses a selective transmission unit 110 to manage a conference call with multiple communication devices 102, 104, and 112. Although only three communication devices are illustrated, it is understood that any number of devices may be in communication with the server 108, subject to technical limitations such as bandwidth, processing power, and/or similar factors.

The communication devices 102, 104, and 112 may be mobile devices (e.g., tablets, smartphones, personal digital assistants (PDAs), or netbooks), laptops, desktops, workstations, smart televisions, and/or any other computing device capable of receiving and/or sending electronic communications via a wired or wireless network connection. Such communications may be direct (e.g., via a peer-to-peer network, an ad hoc network, or using a direct connection), indirect, such as through a server or other proxy (e.g., in a client-server model), or may use a combination of direct and indirect communications.

One video optimization method involves the use of video scaling, which enables more efficient resource usage in video communications. Generally, the scaling of video may be accomplished using two different methods. The first scaling method is resolution scaling, in which a video frame has similar information at different resolutions, but uses different amounts of bandwidth due to the different resolutions. The second scaling method is temporal scaling, in which reference frames are arranged such that every other frame (or some percentage or number of frames) can be dropped without any real impact on the decoding process. The present disclosure refers generally to resolution scaling, although it is understood that temporal scaling may be incorporated with aspects of the described embodiments.

The present disclosure provides a scaling approach that enables video optimizations for various devices even when those devices do not include support for standards such as Scalable Video Coding (SVC) as embodied in the Annex G extension of the H.264/MPEG-4 AVC video compression standard. This allows the present disclosure's approach to be used with a broad range of devices, including devices such as older mobile phones and devices with different encoding and decoding hardware and/or software. By dynamically adjusting to each device's capabilities, the scaling process may be configured to achieve an optimized outcome that may take into account the device itself, available network bandwidth, and/or other factors. Furthermore, for devices that support standards such as SVC, the present disclosure's approach may provide more flexibility due to its enabling of independent encoding steps and the provision for using different encoders during different steps of the encoding process. For purposes of convenience, the terms "codec," "video coding format," and "video coding standard" may be used interchangeably in the present disclosure.

Figure 2:
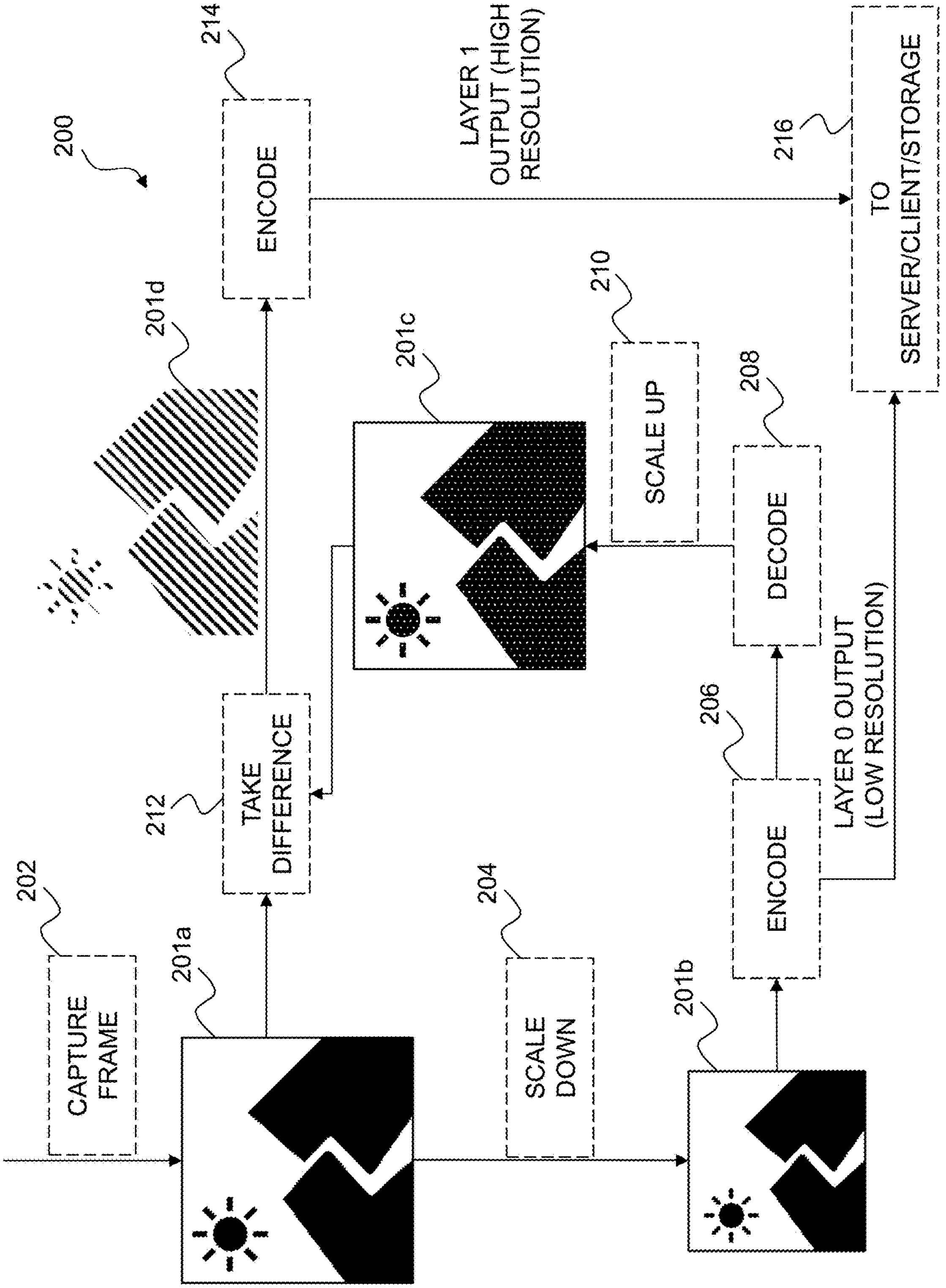
FIG. 2 illustrates one embodiment of an encoding process that may be used by a transmitting device to optimize a video frame prior to transmission or storage.

Referring to FIG. 2, one embodiment of an encoding process 200 that may be used by a sending device (e.g., one of the communication devices of FIGS. 1A-1C or the server 106/STU 110) is illustrated. An original video frame 201*a* is captured by a camera in step 202. The resolution and other parameters of the video frame 201*a* may depend on the settings used to capture the image, the quality of the camera, and/or similar factors. For purposes of example, the video frame is captured at 1280×720.

The original frame is then scaled down in step 204 to create a scaled down frame 201*b*. The scaling may be performed, for example, using the device's GPU. For purposes of example, the original video frame 201*a* is scaled down to 320×180 for the frame 201*b*. The frame 201*b* is then encoded in step 206 to produce a Layer 0 output. The Layer 0 output is sent to a server, another device, and/or to storage in step 216, depending on the environment within which the device is operating.

Depending on factors such as the level of scaling and the compression type used, Layer 0 may be significantly smaller than the original frame while containing much of the same information as the original frame. For example, Layer 0 may be around $1/16^{th}$ the size of the original image and the amount of bandwidth may be reduced to around $1/8^{th}$ of the original bandwidth that would otherwise be needed.

The Layer 0 output is decoded in step 208 and scaled up to the original resolution in step 210 to create a frame 201*c*. In the present example, the decoded frame 201*b* is scaled up from 320×180 to 1280×720 by the GPU. Due to the process of scaling and/or encoding/decoding, the 201*b* frame will likely not be exactly the same as the original frame 201*a* even after it is scaled up. For example, if a lossy algorithm is used to scale down the frame to 320×180, then some information will generally be lost during the downscaling process. When the frame is upscaled to the original resolution as frame 201*c*, the lost information may result in differences between the scaled up frame 201*c* and the original frame 201*a*.

In step 212, the difference between the original frame 201*a* and the scaled up frame 201*c* is calculated. This operation may be performed, for example, by the GPU. This difference results in a "ghost" image 201*d* that contains the differences between the original frame 201*a* and the scaled up frame 201*c*. The actual content of the ghost image 201*d* may vary depending on the process used to scale the frame and the encoding process used to create the Layer 0 output. In step 214, the ghost image 201*d* is encoded to produce a Layer 1 output. The Layer 1 output is sent to a server, another device, and/or storage in step 216, depending on the environment within which the device is operating. Is it understood that the terms "Layer 0" and "Layer 1" are used for purposes of illustration and any identifiers may be used for the encoder outputs.

It is noted that the encoding step 214 is independent of the encoding step 206. Accordingly, different encoding processes may be used by the two steps or the same encoding process may be used. This allows flexibility in the encoding processes. For example, a preferred encoder for the low resolution encoding that produces the Layer 0 output may not be ideal for the high resolution encoding of step 214. Accordingly, because of the described independent encoding process, the encoding steps 206 and 214 may be performed using different video coding standards.

The encoders may provide header information, such as encoder type, layer number, timestamps (e.g., to ensure the correct Layer 0 and Layer 1 frames are used properly on the receiving device), resolution information, and/or other information. The encoding process 200 of FIG. 2, including the creation and inclusion of header information, may be managed by an application on the device, and may include coordination with an STU (e.g., the STU 110) of FIG. 1C and/or other communication devices. According, determining which video coding standards may be used may include a negotiation process with other devices. The encoders may be hardware, while the decoders (which are generally less complex and use fewer resources) may be hardware or software. If hardware encoders are not available, software encoders may be used with adjustments made to account for the slower encoding and higher resource usage.

It is noted that, in the present embodiment, information may not be transferred between the two independently operating encoders. Instead, each encoder may simply encode the frame it receives without taking information from the other encoder into account. In other embodiments, information may be transferred between the encoders. While two separate encoders are used for purposes of example, both encoding steps may be performed by a single encoder in some embodiments.

Figure 3:
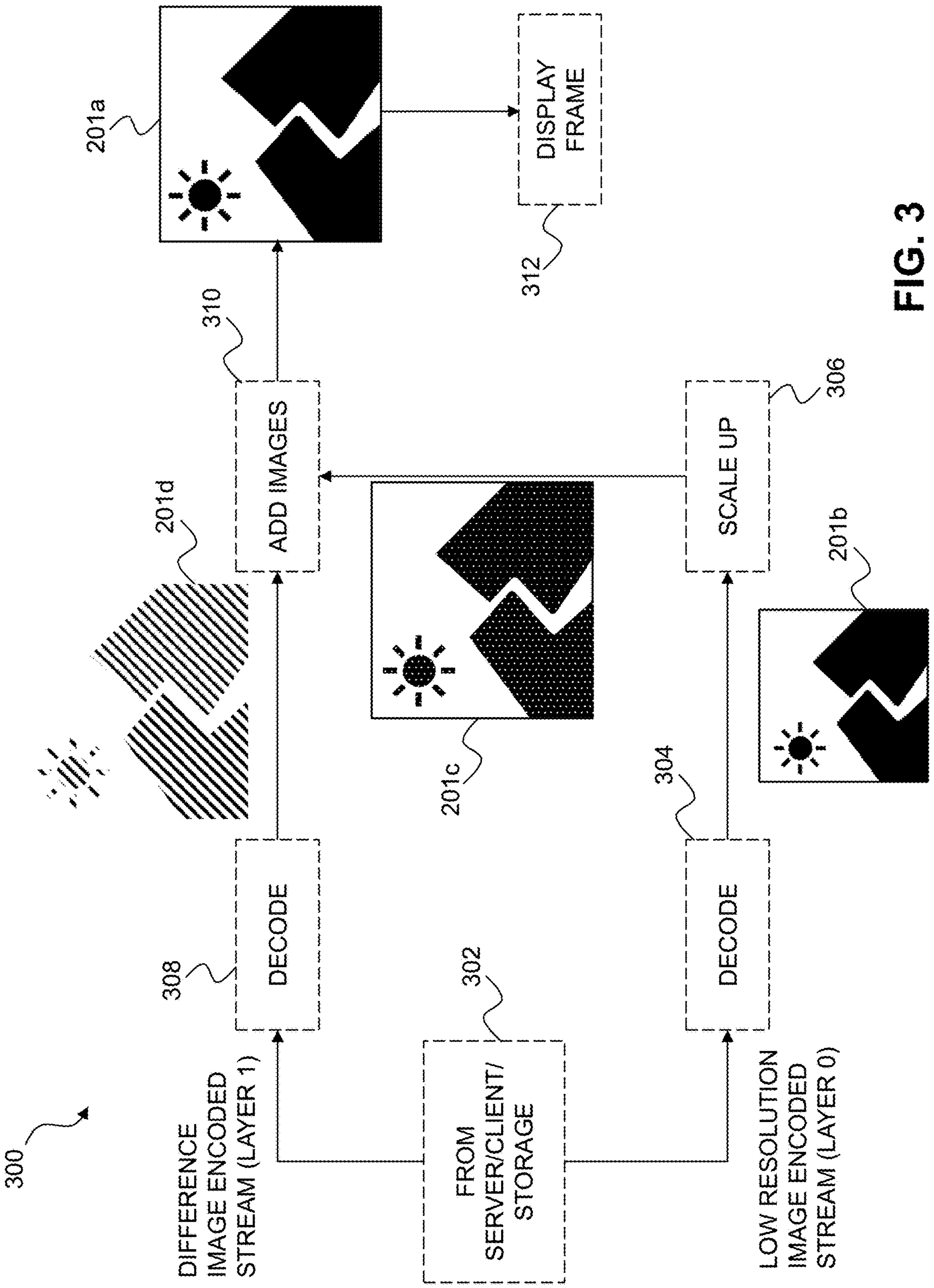
FIG. 3 illustrates one embodiment of a decoding process that may be used by a receiving device to recover a video frame optimized by the encoding process of FIG. 2.

Referring to FIG. 3, one embodiment of a decoding process 300 that may be used by a receiving device (e.g., one of the communication devices of FIGS. 1A-1C or the server 106/STU 110) is illustrated. For purposes of example, the receiving device is receiving the Layer 0 and Layer 1 outputs sent by the process 200 of FIG. 2. The Layer 0 and Layer 1 outputs of FIG. 2 are received in step 302. The low resolution Layer 0 stream is decoded in step 304 to recover the scaled down frame 201*b*. The frame 201*b* is scaled up (e.g., by the GPU) from its current resolution of 320×180 to the resolution of 1280×720 for frame 201*c* that will match the ghost image 201*d*.

The high resolution Layer 1 stream is independently decoded in step 308 to recover the ghost image 201*d*.

Depending on the video coding standards used to encode the Layer 0 and Layer 1 outputs, the decoders for steps 304 and 308 may be different or may be the same. The ghost image 201*d* and the scaled up frame 201*c* are added in step 310 (e.g., by the GPU) to recreate the image 201*a* or an approximation thereof. It is noted that the recreated frame 201*a* of FIG. 3 may not exactly match the original frame of FIG. 2. The recreated frame 201*a* is then displayed in step 312.

It is understood that the encoder/decoder may depend on the device and its capabilities. Examples of hardware and software vendors and their supported encoder/decoder standards that may be used with the present disclosure are provided below in Table 1.

TABLE 1

| Chipset Vendor/Software Vendor | Encoder/Decoder Standards Supported |
|---|---|
| Qualcomm | Vp8, H.264 |
| Samsung Exynos | Vp8, H.264 |
| MediaTek | H.264 |
| Google (software) | Vp9, Vp8, H.264 |
| Apple (iPhone) | H.264 |

As can be seen, some devices may not support certain video coding standards, which in turn affects the selection of the encoders used in the encoding process 200 of FIG. 2. The receiving device is also taken into account, as it must be able to decode the received Layer 0 and Layer 1 streams. Examples of possible pairings of sending and receiving devices are provided in the following Tables 2-5. It is noted that if no native compatibility exists between two devices, a software encoder/decoder solution may be provided (identified as Damaka H.264 in the following tables). Listed standards may be in order of preference, but the order may change in some situations.

TABLE 2

| Android Transmitter (Encoder) | | |
|---|---|---|
| Low Resolution | Difference Image | Android Receiver (Decoder) |
| Vp9, Vp8, H.264, Damaka H.264 | Vp8, H.264 | Vp9, Vp8, H.264, Damaka H.264 |

TABLE 3

| Android Transmitter (Encoder) | | |
|---|---|---|
| Low Resolution | Difference Image | iPhone Receiver (Decoder) |
| Vp9, Vp8, H.264, Damaka H.264 | Vp8, H.264 | Hardware: H.264<br>Software: Vp9, Vp8 |

TABLE 4

| Iphone Transmitter (Encoder) | | |
|---|---|---|
| Low Resolution | Difference Image | Android Receiver (Decoder) |
| H.264 | H.264 | H.264 |

TABLE 5

| Iphone Transmitter (Encoder) | | |
|---|---|---|
| Low Resolution | Difference Image | iPhone Receiver (Decoder) |
| H.264 | H.264 | H.264 |

It is understood that many different combinations are possible and such combinations may change as new models of devices are introduced, as well as new or modified encoders and decoders. Accordingly, due to the flexibility provided by the encoding process described herein, the process may be applied relatively easily to currently unreleased combinations of hardware and software.

Generally, the process described herein encodes both lower resolution video frames and difference video frames independently. The type of encoder used for lower resolutions can be different from the type of encoder used for higher resolution. For example, Vp9 can be used for low resolution encoding, while Vp8 (which may have built-in support in current devices) can be used for high resolution encoding. The process on the receiving end uses independent decoding and the synchronized addition of images.

Figure 4:
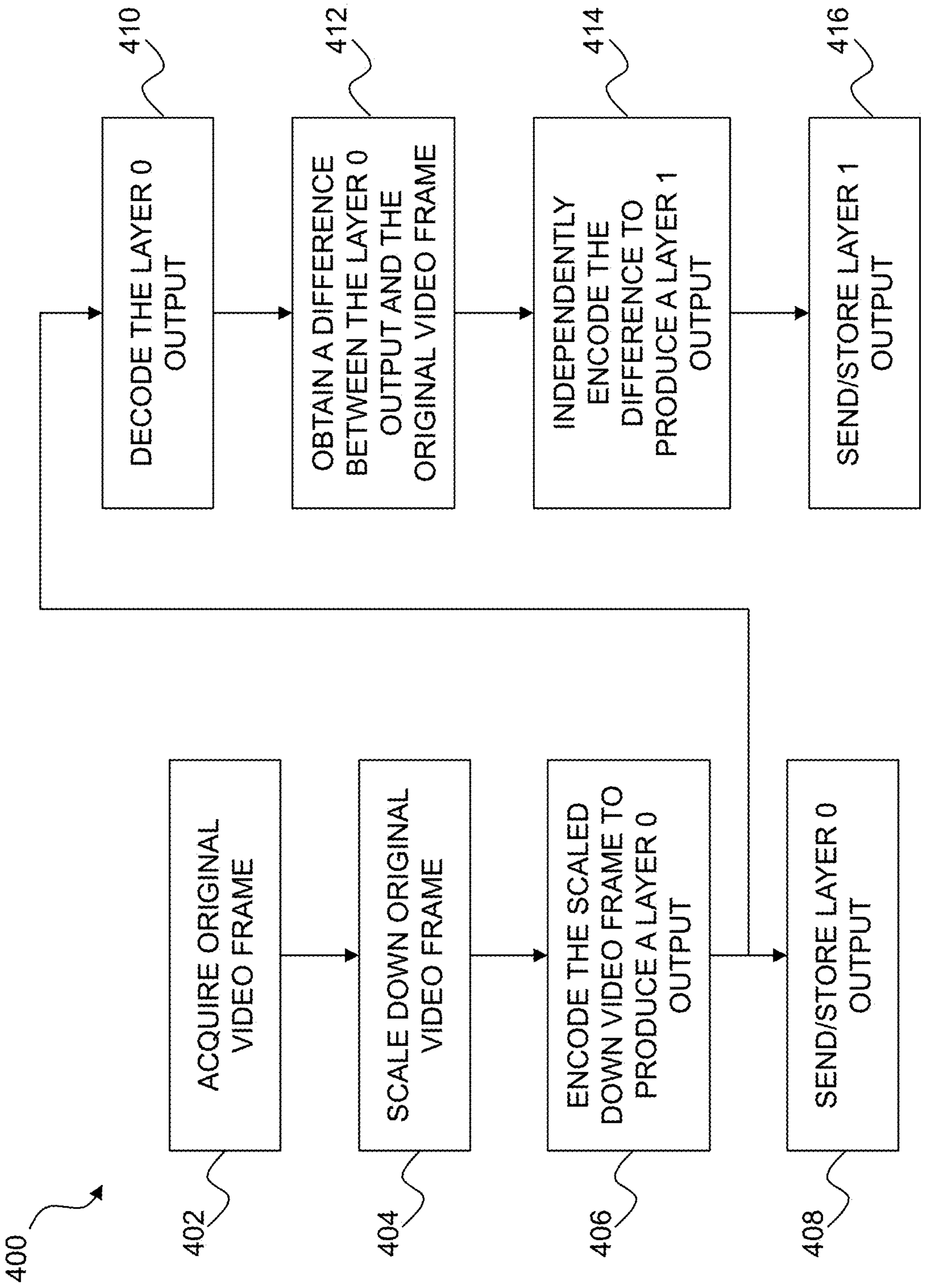
FIG. 4 illustrates a flow chart showing one embodiment of an encoding process that may be used by a transmitting device to optimize a video frame prior to transmission or storage.

Referring to FIG. 4, a flowchart illustrates one embodiment of a method 400 that may be used by a device to encode and send video information. In step 402, an original video frame is acquired. In step 404, the original video frame is scaled down. In step 406, the scaled down video frame is encoded to produce a Layer 0 output. In step 408, the Layer 0 output is transmitted or stored. In step 410, the Layer 0 output is decoded. In step 412, a difference between the Layer 0 output and the original video frame is obtained. In step 414, the difference is encoded to produce a Layer 1 output. This encoding is independent of the encoding in step 406 and may use a different video coding standard. In step 416, the Layer 1 output is transmitted or stored.

Figure 5:
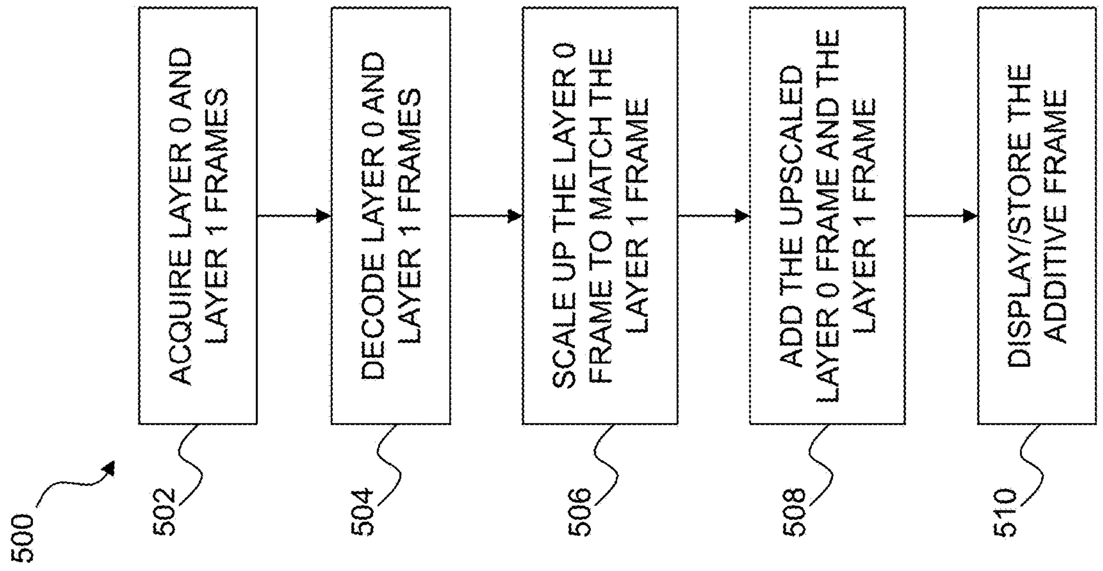
FIG. 5 illustrates a flow chart showing one embodiment of a decoding process that may be used by a receiving device to recover a video frame optimized by the encoding process of FIG. 4.

Referring to FIG. 5, a flowchart illustrates one embodiment of a method 500 that may be used by a device to decode received video information. In step 502, a Layer 0 frame and a Layer 1 frame are obtained. In step 504, the Layer 0 and Layer 1 frames are decoded. In step 506, the decoded Layer 0 frame is scaled up to match the resolution of the decoded Layer 1 frame. In step 508, the scaled up Layer 0 frame and the Layer 1 frame are added to create an additive frame. In step 510, the additive frame is displayed.

Figure 6:
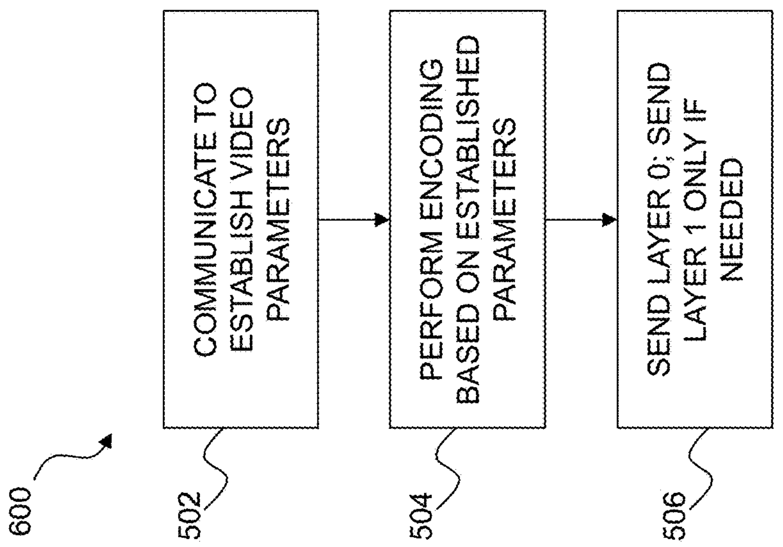
FIG. 6 illustrates a flow chart showing one embodiment of a process that may occur to establish and use video encoding parameters.

Referring to FIG. 6, a flowchart illustrates one embodiment of a method 600 that may be used by a device to establish video parameters. In step 502, video parameters are established during communications with a server and/or another device. In step 504, encoding is performed based on the established parameters. In step 506, Layer 0 output is sent, and Layer 1 output is sent if needed.

Figure 7:
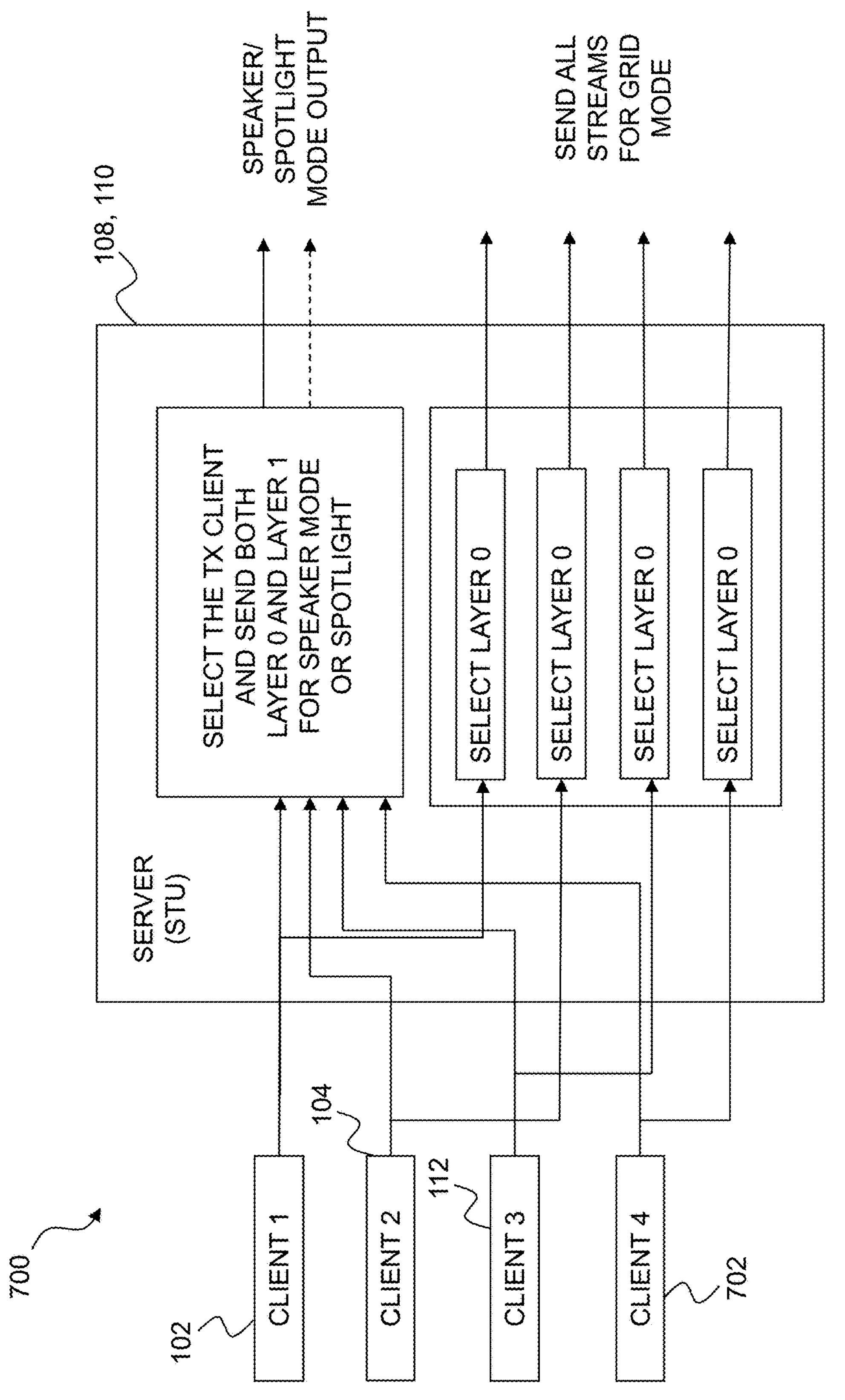
FIG. 7 illustrates one embodiment of a server conference call environment within which different encoded frames may be used for video communications.

Referring to FIG. 7, one embodiment of an environment 700 illustrates (from the perspective of the device 102) communication devices 102, 104, 112, and 702 interacting on a conference call via a server 108/STU 110. In the present example, each device 102, 104, 112, and 702 may have the ability to transmit at multiple resolutions and to receive multiple streams of video of different participants. Accordingly, the STU 110 includes logic to determine such factors as what resolution(s) each device should use to send its video to the server 108, how many video streams each device should receive from the server 108, and how many "small" videos and "large" videos should be sent to a device. In the present example, a "small" video uses only Layer 0 frames and a "large" video uses the recreated frames formed by adding the Layer 0 and Layer 1 frames. Accordingly, a device may be showing users in a grid (generally "small" videos) and/or may have one user in a spotlight (a "large" video). The STU 110 then selects and transmits the video streams as needed.

Compared to a simulcast conference call model, the described process may provide all required video streams while using less bandwidth (e.g., approximately fifteen to thirty percent less). The process may, in some situations, cause an additional delay (e.g., thirty-three to eighty milliseconds). It is understood that these examples may vary based on a large number of factors and are for purposes of illustration only. Adjustments may be made, for example, by reducing the bit rate, changing the maximum resolution, sending only Layer 0 frames, and/or dropping the frame rate.

Figure 8A:
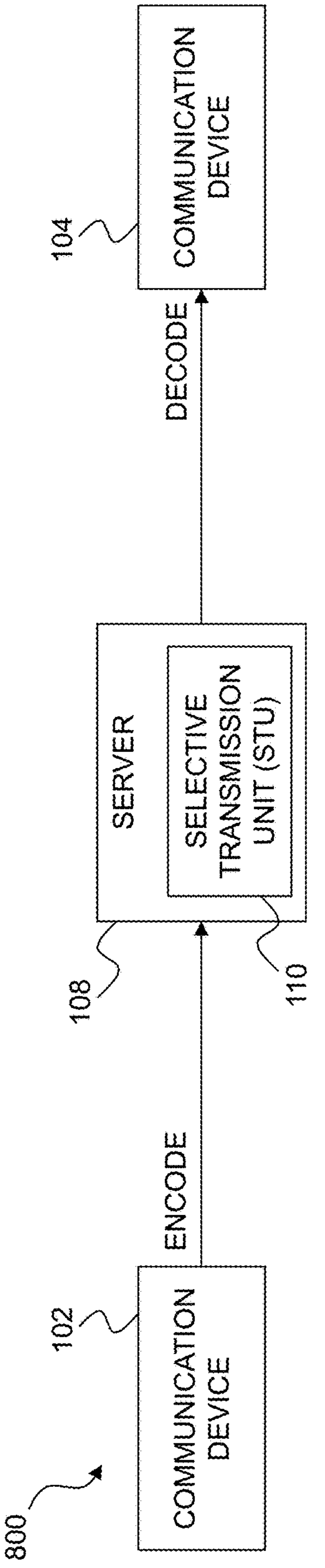
FIGS. 8A-8D illustrate various embodiments of environments showing different optimization configurations.

Referring to FIGS. 8A-8D, embodiments of an environment 800 are illustrated within which various aspects of the present disclosure may be practiced. In previous embodiments, as shown with respect to FIG. 8A, the server 108/STU 110 was generally managing multiple devices with each device performing the encoding and decoding operations needed for that device. This distribution of encoding/decoding may enable the STU 110 to handle more devices for a particular conference session (e.g., may provide more scalability) as the encoding and decoding processes are offloaded to each device, rather than being performed by the server 108/STU 110. FIG. 8A may also illustrate the storage of encoded data from the device 102 and then the forwarding of the encoded data to the device 104 for decoding. However, in FIGS. 8B-8D, the server 108/STU 110 may perform encoding and/or decoding steps when communicating with a device.

Figure 8B:
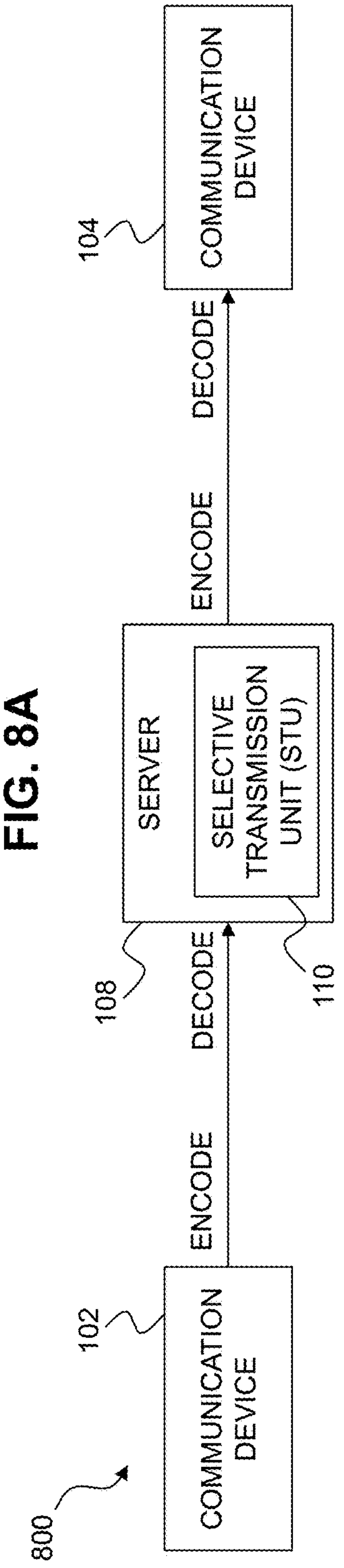

Referring to FIG. 8B, the device 102 may be streaming (or may have previously streamed) video data to the server 108. It is understood that the video stream may be processed by the server 108 without use of the STU 110 or may be managed by the STU 110. The video stream may be sent in encoded format (e.g., using the video scaling optimization process disclosed herein) as shown and the server 108/STU 110 decodes the stream. The server 108/STU 110 then encodes the data prior to sending the data to the device 104, which decodes the data. In the illustration of FIG. 8B, it is understood that encoding/decoding negotiations may occur between each device 102, 104 and the server 108/STU 110, or the server 108/STU 110 may use information from negotiations between the devices 102 and 104 for its encoding and decoding.

Figure 8C:
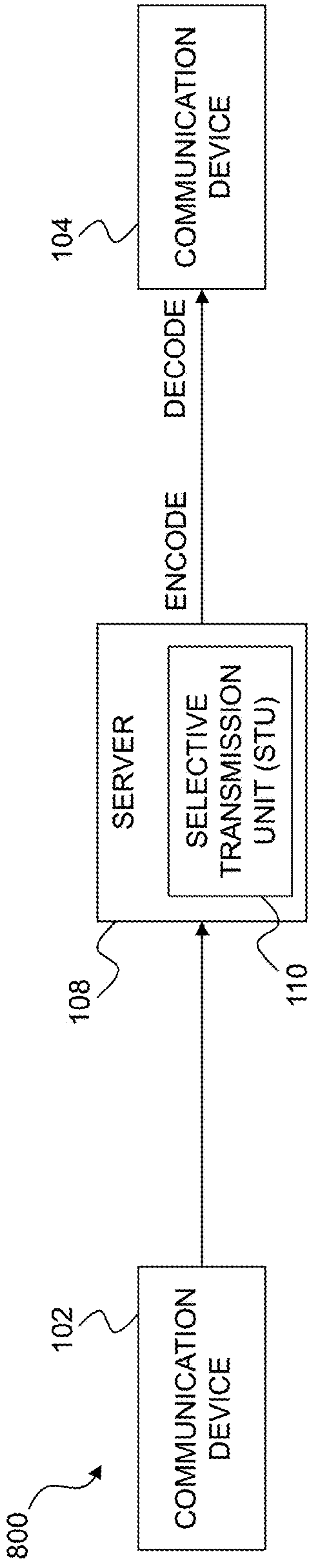

Referring to FIG. 8C, the device 102 may be streaming (or may have previously streamed) video data to the server 108. It is understood that the video stream may be processed by the server 108 without use of the STU 110 or may be managed by the STU 110. However, the video stream is not in encoded format (e.g., does not use the video scaling optimization process disclosed herein) as shown and the server 108/STU 110 does not need to decode the stream. The server 108/STU 110 then encodes the data prior to sending the data to the device 104, which decodes the data. In the illustration of FIG. 8C, it is understood that encoding/decoding negotiations may occur between the device 104 and the server 108/STU 110.

Figure 8D:
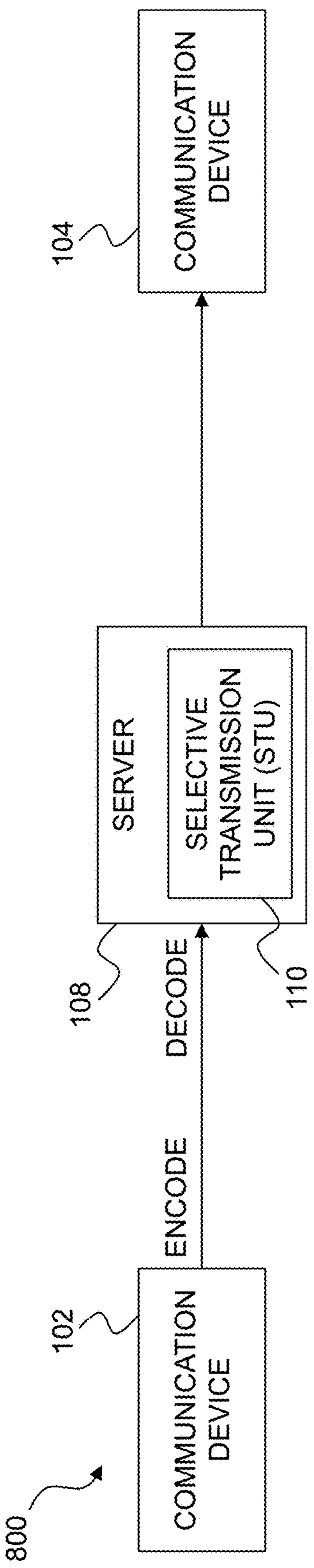

Referring to FIG. 8D, the device 102 may be streaming (or may have previously streamed) video data to the server 108. It is understood that the video stream may be processed by the server 108 without use of the STU 110 or may be managed by the STU 110. The video stream may be sent in encoded format (e.g., using the video scaling optimization process disclosed herein) as shown and the server 108/STU

110 decodes the stream. The server 108/STU 110 then sends the data to the device 104 without encoding, and the device 104 does not need to decode the data. In the illustration of FIG. 8D, it is understood that encoding/decoding negotiations may occur between the device 102 and the server 108/STU 110.

As an example scenario using server-side encoding and decoding, the device 102 may stream video data to the server 108 for storage. The device 102 then goes offline. During a later communication session, the server 108/STU 110 retrieves the stored data and provides it to the device 104. As the device 104 was not able to negotiate the encoding/decoding parameters with the device 102, the server 108/STU 110 may perform encoding/decoding in order to establish the parameters with the device 104. It is understood that this process may be used with live streaming video call data, as well as with stored data. It is further understood that this server-side encoding and decoding may occur with only some devices (e.g., the device 102 of FIG. 1C) on a conference call, with other devices (e.g., the devices 104 and 112 of FIG. 1C) being managed as shown in FIG. 8A. This enables the server 108/STU 110 to manage exceptions on a per device basis, while still offloading as much of the encoding/decoding to the remaining devices as possible.

Figure 9:
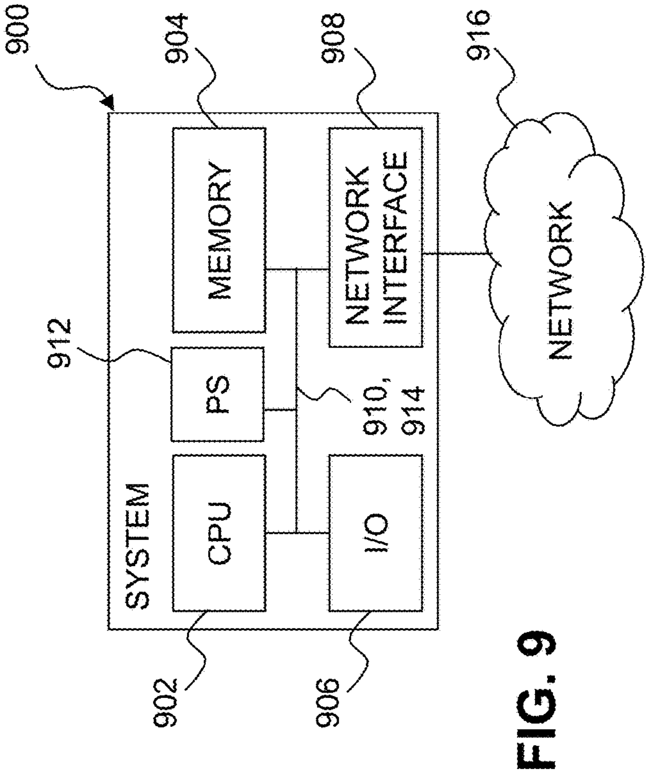
FIG. 9 is a simplified diagram of one embodiment of a computer system that may be used in embodiments of the present disclosure as a communication device or a server.

Referring to FIG. 9, one embodiment of a computer system 900 is illustrated. The computer system 900 is one possible example of a system component or computing device such as a communication device or a server. The computer system 900 may include a controller (e.g., a central processing unit ("CPU")) 902, a memory unit 904, an input/output ("I/O") device 906, and a network interface 908. The components 902, 904, 906, and 908 are interconnected by a transport system (e.g., a bus) 910. A power supply (PS) 912 may provide power to components of the computer system 900, such as the CPU 902 and memory unit 904. It is understood that the computer system 900 may be differently configured and that each of the listed components may actually represent several different components. For example, the CPU 902 may actually represent a multiprocessor or a distributed processing system; the memory unit 904 may include different levels of cache memory, main memory, hard disks, and remote storage locations; the I/O device 906 may include monitors, keyboards, and the like; and the network interface 908 may include one or more network cards providing one or more wired and/or wireless connections to a network 916. Therefore, a wide range of flexibility is anticipated in the configuration of the computer system 900.

The computer system 900 may use any operating system (or multiple operating systems), including various versions of operating systems provided by Microsoft (such as WINDOWS), Apple (such as iOS or Mac OS X), Google (Android), UNIX, and LINUX, and may include operating systems specifically developed for handheld devices, personal computers, and servers depending on the use of the computer system 900. The operating system, as well as other instructions (e.g., for the processes and message sequences described herein), may be stored in the memory unit 904 and executed by the processor 902. For example, if the computer system 900 is the server 108 or a communication device 102, 104, 112, or 702, the memory unit 904 may include instructions for performing some or all of the message sequences and methods described with respect to such devices in the present disclosure.

The network 916 may be a single network or may represent multiple networks, including networks of different types. For example, the server 108 or a communication device 102, 104, 112, or 702 may be coupled to a network that includes a cellular link coupled to a data packet network, or data packet link such as a wide local area network (WLAN) coupled to a data packet network. Accordingly, many different network types and configurations may be used to establish communications between the server 108, communication devices 102, 104, 112, 702, servers, and/or other components described herein.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

Communication among the server 108, communication devices 102, 104, 112, 702, servers, and/or other components described herein may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP), File Transfer Protocol (FTP), and/or HyperText Transfer Protocol (HTTP). A sharing session and other communications as described herein may be connection-based (e.g., using a protocol such as the transmission control protocol/internet protocol (TCP/IP)) or connection-less (e.g., using a protocol such as the user datagram protocol (UDP)). It is understood that various types of communications may occur simultaneously, including, but not limited to, voice calls, instant messages, audio and video, emails, document sharing, and any other type of resource transfer, where a resource represents any digital data.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for optimizing video on a device, the method comprising:

identifying an original video frame to be sent by the device;

scaling the original video frame down to a lower resolution video frame;

encoding the lower resolution video frame to produce a first layer output;

decoding the first layer output;

upscaling the decoded first layer output to match a resolution of the original video frame;

obtaining a difference between the upscaled decoded first layer output and the original video frame; and encoding the difference to produce a second layer output.

2. The method of claim 1 wherein the encoding to produce the first layer output is performed by a first encoder and the encoding to produce the second layer output is performed by a second encoder that is separate from the first encoder.

3. The method of claim 2 further comprising transferring information from at least one of the first and second encoders to the other of the first and second encoders.

4. The method of claim 2 wherein no information is transferred between the first encoder and the second encoder.

5. The method of claim 1 wherein the encoding to produce the first layer output and the encoding to produce the second layer output is performed by a single encoder.

6. The method of claim 1 wherein the encoding to produce the first layer output and the encoding to produce the second layer output is performed using different video coding standards.

7. The method of claim 1 wherein the encoding to produce the first layer output and the encoding to produce the second layer output is performed using identical video coding standards.

8. The method of claim 1 further comprising communicating, by the device, with another device in order to determine which video coding standard is to be used to perform the encoding for at least one of the first layer output and the second layer output.

9. The method of claim 1 further comprising sending the first layer output and the second layer output to another device.

10. The method of claim 1 further comprising sending the first layer output and the second layer output to a storage device.

11. A method for decoding video for display by a device, the method comprising:

identifying whether an encoded second video layer has been received along with an encoded first video layer;

decoding the encoded first video layer;

decoding the encoded second video layer only if the encoded second video layer has been received and is needed by the device;

upscaling the decoded first video layer to a resolution matching a resolution of the decoded second video layer only if the second video layer is needed; and adding the upscaled decoded first video layer and the decoded second video layer to create an additive video frame to be displayed.

12. The method of claim 11 further comprising displaying only the decoded first video layer if the encoded second video layer is not needed.

13. The method of claim 11 wherein the decoding of the encoded first video layer is performed by a first decoder and the decoding of the encoded second video layer is performed by a second decoder that is separate from the first decoder.

14. The method of claim 11 wherein the decoding of the encoded first video layer is performed independently of the decoding of the encoded second video layer.

15. The method of claim 11 wherein the decoding of the encoded first video layer and the decoding of the encoded second video layer is performed using different video coding standards.

16. The method of claim 11 wherein the decoding of the encoded first video layer and the decoding of the encoded second video layer is performed using identical video coding standards.

17. The method of claim 11 further comprising retrieving the encoded first video layer and the encoded second video layer from a storage device.

18. A device comprising:

a processor; and a memory coupled to the processor, the memory having a plurality of instructions stored therein for execution by the processor, the plurality of instructions including instructions for identifying an original video frame to be sent by the device;

scaling the original video frame down to a lower resolution video frame;

encoding the lower resolution video frame to produce a first layer output;

decoding the first layer output;

upscaling the decoded first layer output to match a resolution of the original video frame;

obtaining a difference between the upscaled decoded first layer output and the original video frame; and encoding the difference to produce a second layer output.

19. The device of claim 18 wherein the encoding to produce the first layer output is performed by a first encoder and the encoding to produce the second layer output is performed by a second encoder that is separate from the first encoder.

20. The device of claim 19 wherein no information is transferred between the first encoder and the second encoder.

* * * * *